No. 626,287. Patented June 6, 1899.
G. H. MODEMANN.
ARTIFICIAL TOOTH AND PLATE.
(Application filed Aug. 17, 1896.)

(No Model.)

WITNESS:
John Buckler,
C. Gerst

INVENTOR
George H. Modemann,
BY
Edgar Tate & Co
ATTORNEYS

UNITED STATES PATENT OFFICE.

GEORGE H. MODEMANN, OF NEW YORK, N. Y.

ARTIFICIAL TOOTH AND PLATE.

SPECIFICATION forming part of Letters Patent No. 626,287, dated June 6, 1899.

Application filed August 17, 1896. Serial No. 603,041. (No model.)

*To all whom it may concern:*

Be it known that I, GEORGE H. MODEMANN, a citizen of the United States, and a resident of New York, in the county of New York and State of New York, have invented certain new and useful Improvements in Artificial Teeth and Plates, of which the following is a specification, reference being had to the accompanying drawings, forming a part thereof, in which similar numerals of reference indicate corresponding parts wherever found throughout the several views.

This invention relates to the manufacture of artificial teeth and plates therefor; and it involves a process of attaching rubber teeth to vulcanized rubber plates, also a process of molding or forming a rubber plate and the teeth therefor integrally, and also the formation of soft-rubber teeth separately, and in securing a set of such teeth together in a continuous strip, with the object of setting the same up or connecting the same onto a rubber plate in the same manner as ordinary porcelain teeth are set up, said rubber teeth to be vulcanized integrally with the plate or to be secured thereto by revulcanization.

The invention is fully disclosed in the following specification, of which the accompanying drawings form a part, in which—

Figure 1:
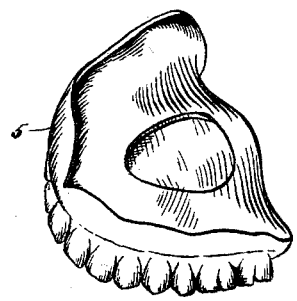
Figure 2:
Figure 3:
Figure 4:
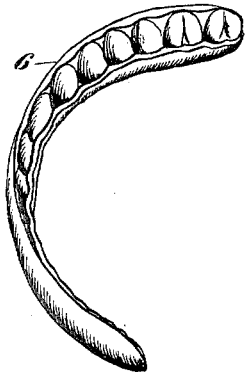

Figure 1 is a perspective view of a rubber plate made according to my invention and provided with rubber teeth, which are formed integrally therewith, said plate and teeth being molded together; Fig. 2, a set of teeth composed of soft or unvulcanized rubber and united in a continuous strip; Fig. 3, a similar view of a set of teeth composed of soft or unvulcanized rubber and unattached; Fig. 4, a perspective view of a matrix which I employ in forming a mold for a complete plate, and Fig. 5 a cross-section of a flask consisting of two separate parts and showing a plate invested therein.

The first part of my invention, as hereinbefore stated, relates to the attachment of soft-rubber teeth either singly or in a continuous strip or sections to rubber plates, and in practice I accomplish this by first forming or molding the soft-rubber teeth, and these soft-rubber teeth are set up on an articulator in the manner usually followed in articulating porcelain teeth prior to investing the plate and teeth in plaster in a flask.

The second feature of my invention consists in forming a rubber or vulcanite plate and rubber teeth integrally, as shown at 5 in Fig. 1, and this I accomplish by first forming the plate and then by setting up thereon or connecting therewith the rubber teeth on an articulator in the usual manner. The plate, with the teeth connected therewith, as above described, is then invested in plaster-of-paris in a flask and packed with rubber in the usual manner, after which the rubber plate and rubber teeth are connected by vulcanization.

Instead of following the above process I may form a vulcanite plate and rubber teeth integrally by constructing a preliminary plate in the usual manner, consisting of a wax base provided with porcelain teeth in the usual manner or as in ordinary practice, and these teeth and the preliminary plate are afterward invested in plaster-of-paris in a suitable flask. The preliminary teeth are then removed from their investment and the teeth are formed or molded of rubber integrally with the base or plate, after which the base or plate and the rubber teeth thus formed are vulcanized together in the usual manner.

In forming the preliminary plate above referred to I can also employ a flexible matrix-strip (shown at 6 in Fig. 4) in place of the preliminary or rubber teeth, and this flexible matrix-strip is bent around the model or cast on the articulator in such manner as to represent the original outline of the teeth to be formed on a wax or other base or plate. The plate provided with said matrix-strip is then invested in the plaster in a flask, said matrix to remain in the investment when the wax plate is removed, thus forming a matrix or mold in which the rubber base or plate and teeth are formed integrally, and this matrix may be composed of gold or any preferred metal and may be either removed or retained on the rubber denture, as preferred.

In practice I can also make or form the rubber teeth for the purpose hereinbefore set out in a continuous strip, as shown at 7 in Fig. 2, or in sections, said teeth being connected at their edges or otherwise, and this process of constructing and connecting the teeth enables me to make or form the preliminary plate hereinbefore referred to by simply bending said strip or sections around the cast or model on the articulator, and the said soft-rubber teeth either separately or connected in a continuous strip or sections may be made or employed in ordinary dental practice in all cases where ordinary porcelain teeth are now employed, the said soft-rubber teeth to be set up on the preliminary plate on an articulator in the position or positions they are intended to occupy in the same manner in which ordinary porcelain teeth are usually set up.

Figure 5:
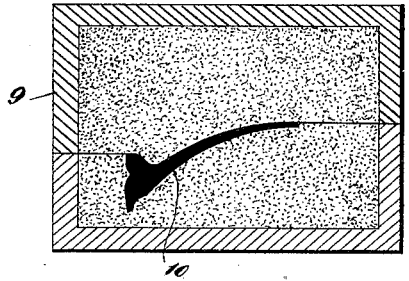

I have shown at 8 in Fig. 3 a set of soft-rubber teeth made separately, which may be used as hereinbefore described, and at 9 in Fig. 5 a flask composed of two parts, each of which is filled with plaster-of-paris, and in the flask thus formed is shown at 10 a base or plate constructed as herein described; but my invention is not limited to the use of any particular form of flask.

Having fully described my invention, I claim as new and desire to secure by Letters Patent—

1. The herein-described process for forming an artificial denture, consisting of a rubber base or plate, and artificial teeth formed integrally, said process consisting of first providing a flexible metallic matrix, cross-sections of which at various points, correspond with similar sections of the natural teeth, and which is provided in the inner walls thereof, with depressions and prominences which conform to the labial and occluding surface of a complete set of teeth, then forming a preliminary plate or base, and connecting said matrix therewith in the place of the teeth usually employed, then investing said preliminary plate and said matrix in plaster in a flask, then removing the preliminary base or plate, retaining the matrix in the investment to form a mold for the artificial teeth, and then packing the investment with rubber to form a base or plate, and the teeth, and vulcanizing said plate or base and said teeth together, substantially as shown and described.

2. An artificial denture, consisting of a rubber base or plate so formed as to conform to the shape of the mouth, said plate or base being provided with rubber teeth formed integrally therewith, substantially as shown and described.

In testimony that I claim the foregoing as my invention I have signed my name, in presence of the subscribing witnesses, this 13th day of August, 1896.

GEORGE H. MODEMANN.

Witnesses:
W. W. HILL,
WILLIAM HOFFMAN.